United States Patent [19]

Hinckley et al.

[11] Patent Number: 5,027,640

[45] Date of Patent: Jul. 2, 1991

[54] SPEEDOMETER/ODOMETER/CRUISE CONTROL TESTER AND RELATED METHODS

[75] Inventors: Hugh D. Hinckley, 1381 S. Main (Rear), Salt Lake City, Utah 84115; Doug Kruesi, Englewood, Colo.

[73] Assignee: Hugh D. Hinckley, Salt Lake City, Utah

[21] Appl. No.: 436,166

[22] Filed: Nov. 14, 1989

[51] Int. Cl.⁵ .............................................. G01D 18/00
[52] U.S. Cl. .......................................... 73/2; 324/202; 340/515
[58] Field of Search ............... 73/2; 324/202; 340/515

[56] References Cited

U.S. PATENT DOCUMENTS

| | | | |
|---|---|---|---|
| 3,956,693 | 5/1976 | Zutrauen et al. | 324/207.16 |
| 3,983,480 | 9/1976 | Meserow et al. | 324/169 |
| 4,023,395 | 5/1977 | Grumblatt | 73/2 |
| 4,185,489 | 1/1980 | Sullivan, Jr. | 73/2 |
| 4,428,224 | 1/1984 | Farazi et al. | 73/2 |
| 4,575,664 | 3/1986 | Johnson | 318/327 |
| 4,701,867 | 10/1987 | Brüggemann | 340/515 |
| 4,871,993 | 10/1989 | Hayashi et al. | 340/515 |

FOREIGN PATENT DOCUMENTS

| | | | |
|---|---|---|---|
| 61-84567 | 4/1986 | Japan | 73/2 |
| 2020034 | 11/1979 | United Kingdom | 73/2 |

OTHER PUBLICATIONS

Archer Technical Data, TLC555 Timer, undated.

Primary Examiner—Hezron E. Williams
Assistant Examiner—Craig Miller
Attorney, Agent, or Firm—Lynn G. Foster

[57] ABSTRACT

An electronic motor control system is taught herein which utilizes a speedometer testing circuit. The (electronic) speedometer/odometer of a vehicle is tested, with the testing device being interconnected with the (input) terminals of the speedometer, exclusive of whether the speedometer is installed or removed from the vehicle. The testing device is utilized without vehicle input to the speedometer in order to determine whether the speedometer can produce an expected signal upon testing thus determining whether the speedometer is functional or not. The testing circuit has a self-contained power supply, is compact in size, and lightweight, thereby insuring complete mobility of the testing unit and dual application of the circuit to both installed and disengaged speedometer and odometer mechanisms. Use of the novel invention and related methods described herein eliminates the former dangerous necessity with prior art of having to test the speedometer which the rear tires of the vehicle are in motion, thus greatly improving the safety of the such testing procedures.

12 Claims, 5 Drawing Sheets

SPEEDOMETER/ODOMETER/CRUISE CONTROL TESTER AND RELATED METHODS

FIELD OF INVENTION

This invention relates generally to speedometer/odometer systems in motor vehicles, and more particularly to a novel electronic testing apparatus, and related methods, by which a speedometer, odometer, or cruise control mechanism can be tested for operation and accuracy, whether installed or removed from a stationary vehicle.

PRIOR ART

In U.S. Pat. No. 4,575,664 issued to Frederick O. Johnson, there is disclosed an electronic tachometer tester, wherein electrical pulse information signals are monitored within a closed loop with the testing device interconnected. The purpose of the device is to test the accuracy of an electrical tachometer while the tachometer is in a closed loop and installed in the vehicle.

While this device is effective in monitoring the accuracy of tachometers still housed in the vehicle, the system must still rely on an external power supply, and thus has limited mobility for testing purposes. Tachometers removed from vehicles or otherwise "outside" the loop circuit of the electrical system of the vehicle cannot be tested with the device. Further, speedometer/odometer and cruise control mechanisms cannot be tested.

Another speedometer/tachometer testing device designed for electrical speedometers is disclosed in U.S. Pat. No. 4,185,489, issued to Maurice D. Sullivan, Jr. In this system, a large, mobile electronic testing apparatus is situated near the rear wheel of a vehicle and a testing sensor is connected to the rear wheel. With the rear wheels of the vehicle elevated and the engine and transmission engaged, the monitoring device tests the accuracy of the speedometer reading as a function of the angular velocity of the rear wheels of the vehicle.

This second speedometer testing device, while able to effectively test speedometers installed in presently functioning vehicles, cannot be connected directly to the speedometer itself. Instead, it must be attached to the rear wheel of the vehicle, thus making it impossible to specifically isolate the malfunctioning components between the rear wheels and the speedometer itself. Further, the rear wheels of the vehicle must be elevated from the ground and the engine and transmission fully engaged before commencing the test procedure. The testing device does not have the dual capacity of both simulating vehicle speed as well as testing the accuracy of the speed read by the speedometer. The apparatus is a large and cumbersome device, with its size and weight creating substantial limitations as to the device's mobility.

In the prior art to test the accuracy and calibration of speedometer/odometer devices, testing equipment has always been limited in its mobility, either being too large and cumbersome, or by lacking a resident power supply, this requiring an external power source to be located nearby. Additionally, a testing device that can test both speedometers and cruise control mechanisms, whether in or out of the vehicle, without requiring the vehicle's engine or transmission to be engaged has yet to be produced.

Applicant is also aware of the following U.S. patents, which are of general interest only, U.S. Pat. Nos. 3,983,480, 4,428,224, 4,023,395.

With the foregoing in mind, prior art electronic speedometer/cruise control testers have not provided an entirely satisfactory degree of mobility and level of safety and convenience in application, and have not produced adequate diversity for testing speedometers, odometers, and cruise control mechanisms, whether installed or removed from the vehicle.

BRIEF SUMMARY AND OBJECTS OF THE INVENTION

In brief summary, the present invention overcomes the aforementioned prior art limitations by providing a novel integrated speedometer/odometer/cruise control tester and related methods. The present invention comprises a portable, dual range speedometer/odometer testing device and related methods, used to simulate vehicle speeds in electronic speedometers and odometers, whether installed or removed from the vehicle. An integrated timing circuit combined with a bilateral transducer, is used to create an astable or free-running state, with the speed at which the timer runs accurately controlled by the charge and discharge of the selected external capacitor engaged. The resulting signal, when sent to a connected speedometer, produces a known, expected speed reading to be displayed by the speedometer, and thus, the speedometer can be checked for accuracy. In an alternative mode, the timer can be manually adjusted to linearly modify the frequency of the signal sent to the speedometer while the speedometer is being viewed to provide a direct dynamic response test. Because the present invention contains a resident power source (a 9 volt battery) it requires no external power supply. Consequently, the vehicle's engine is not required to be running during the test procedure, however, the vehicle's battery must supply 12 volt DC to the speedometer/odometer.

The present speedometer/odometer tester invention, therefore, provides for a safe, inexpensive and reliable speedometer/odometer testing apparatus and related methods and reliable monitoring of the desired simulated speeds exhibited by the speedometer tested. The present invention also allows for virtually unrestricted mobility, thus readily meeting the needs of operations such as salvage companies due to the device's ability to perform testing procedures on speedometer and cruise control mechanisms far removed from a properly functioning vehicle.

With the foregoing in mind, it is a primary object of the present invention to provide a novel electronic speedometer/odometer testing apparatus and related methods.

A further object of the present invention is the provision of such a system whereby the speedometer, odometer, and cruise control mechanisms can all be tested by the same apparatus.

A further dominant object of the present invention is the provision of a testing apparatus that contains a self-contained power supply for its operation.

Another important object of the present invention is to provide a testing apparatus that has a dual range capacity for testing both low and high speed range speedometers.

A further important object of the present invention is the provision of a testing apparatus and related methods that alleviates the dangerous necessity of elevating the vehicle or running the engine during the testing procedure.

These and other objects and features of the present invention will be apparent from the detailed description taken with reference to the accompanying drawings.

DETAILED DESCRIPTION OF THE ILLUSTRATED EMBODIMENT

Figure 1:
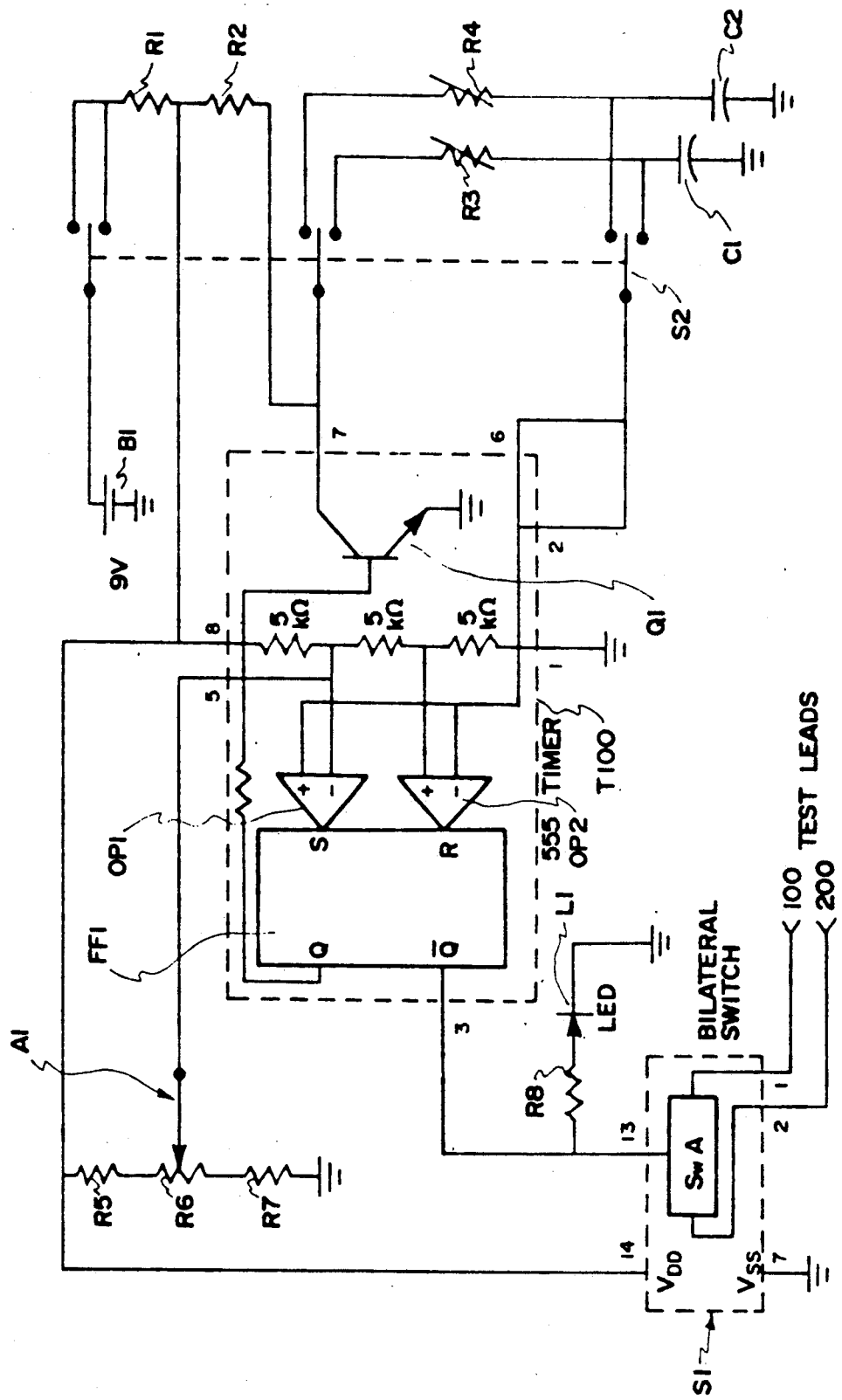
FIG. 1 is a detailed circuit diagram of a testing circuit device incorporating the present invention.
Figure 2:
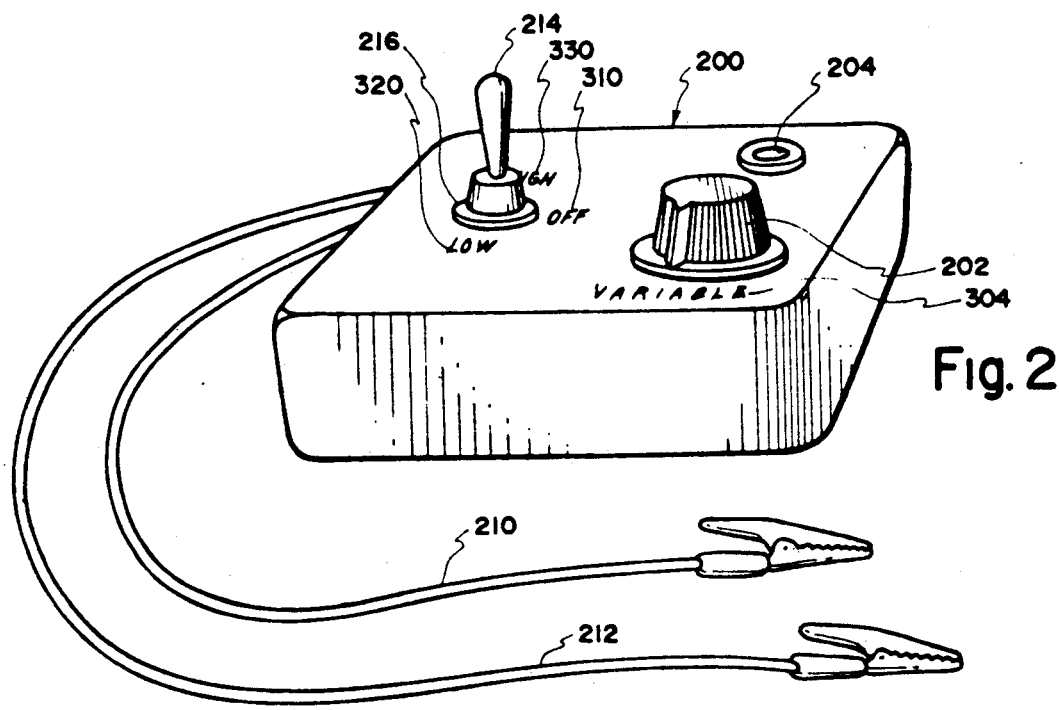
FIG. 2 is a perspective representation of a presently preferred speedometer/odometer testing device assembly embodying the principles of the present invention.
Figure 3:
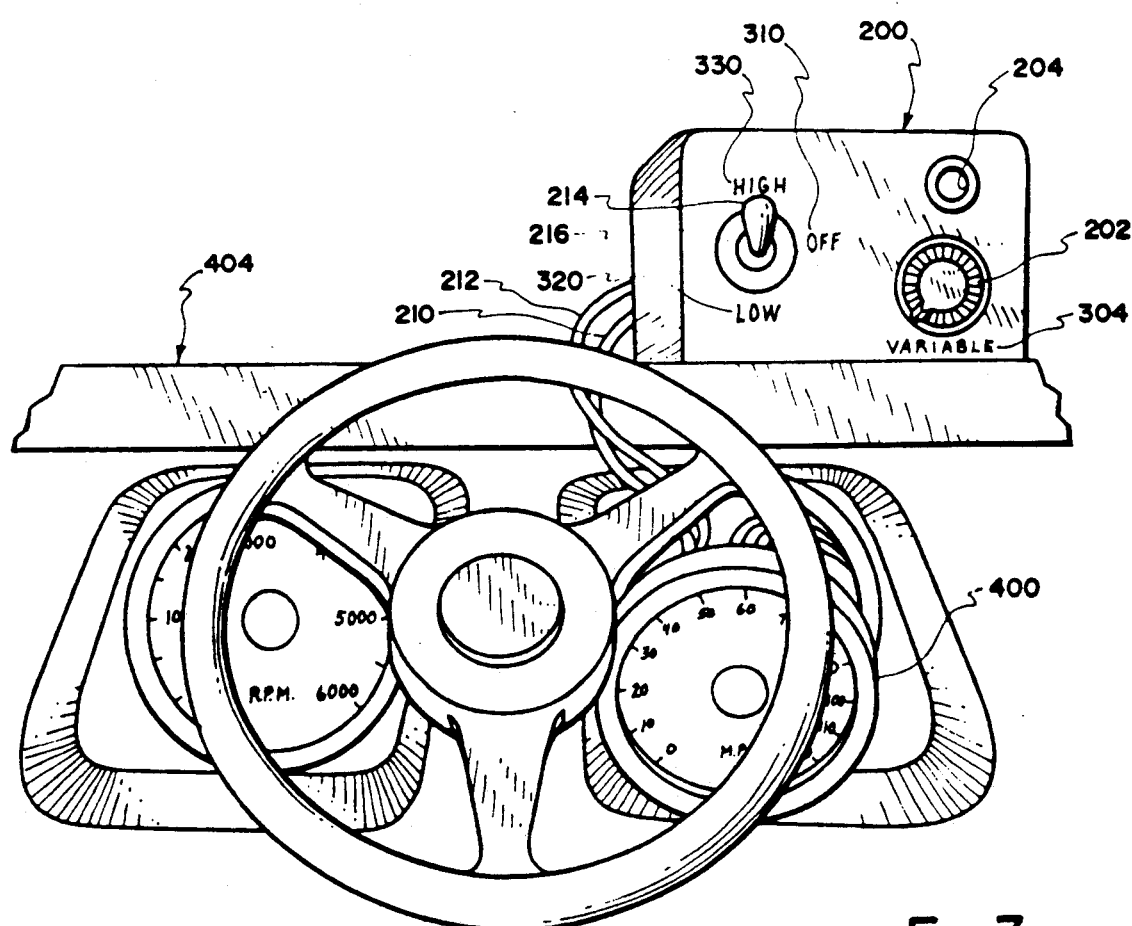
FIG. 3 is a perspective of a presently preferred speedometer/odometer tester shown connected to a speedometer for selectively testing a speedometer installed in a vehicle.
Figure 4:
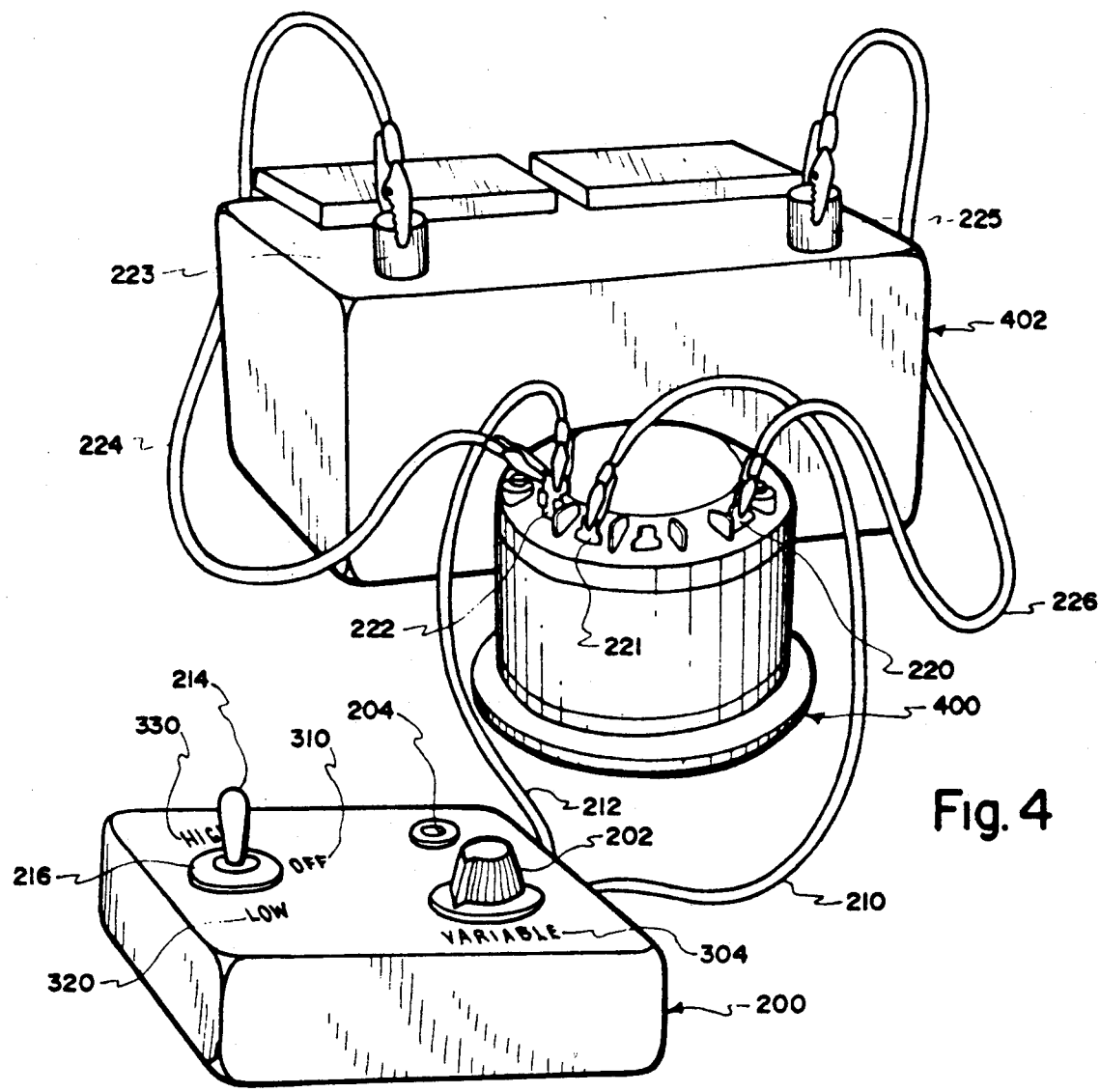
FIG. 4 is a perspective of a presently preferred speedometer/odometer tester shown connected to a speedometer for selectively bench testing a speedometer removed from a vehicle.

The speedometer/odometer testing device (1) is a dual range portable tester for use with electrical speedometers and odometers either installed (see FIG. 3) or removed from vehicles (see FIG. 4). Reference is now made to the drawings, wherein like numerals are used to designate like parts throughout. FIG. 2 illustrates, in perspective, a presently preferred dual-range portable speedometer/odometer testing device, generally designated tester 200. As schematically shown in FIG. 1, the tester 200 is able to accurately simulate both low and high speed ranges, utilizing two capacitors capacitor C1 and capacitor C2, having the values of 1 mf and 0.47 mf, respectively. The tester 200 also utilizes Radio Shack TM TLC 555 timer, generally designated timer T100, a commercially produced, low power consumption/high output monolithic timing circuit that is capable of producing an astable or square wave circuit pattern. When switch S2 selects C1 and R3 and the flip-flop FF1 of the timer T100 operates in a low state, the capacitor C1 is charged through resistors R2 and R3 as shown in FIG. 1. The time constant of the charging circuit is $(R2+R3)C1$. When the capacitor charge reaches $\frac{2}{3}$ of the supply voltage, VCC, operational amplifier OP1 within the timer T100 sets the input to FF1 to a high state, thus setting the flip flop circuit FF1 of timer T100 to the "Q" state. The high state of the "Q" state of flip flop circuit FF1 activates the base of the transistor Q1 causing capacitor C1 to discharge through Q1 to ground. The capacitor C1 then discharges at a rate determined by the expression R3C1. Once the capacitor C1 voltage reaches $\frac{1}{3}$ the supply voltage VCC, the flip-flop FF1 resets to the "Q not" state to begin repetition of the oscillatory timing cycle of the timer T100.

When S2 selects capacitor C2 and resistor R4, the oscillatory cycle similarly repeats, but at a frequency determined by the time constant of $(R2+R4)C2$. The "Q not" output of Flip Flop FF1 is connected to the bilateral control input 13 located in the bilateral transducer or bilateral "switch" S1. When the "Q not" output of Flip Flop FF1 is high, the switch S1 is on. The "Q not" output of Flip Flop FF1 is low, the switch S1 is off. Thus, as Flip Flop FF1 oscillates, bilateral "switch" S1 is on and off. The "Q not" output of Flip Flop FF1 is also connected through resistor R8 to LED L1. The LED L1 blinks on and off signaling the setting and resetting of Flip Flop FF1 and further indicating that the oscillatory circuit timer T100 is working and the tester is on.

Test leads 100 and 102 of the bilateral switch serve as the inputs to the speedometer/odometer from tester 200. The output signal delivered through test leads 100 and 102 emulates the vehicle generated oscillatory square wave signal the frequency of which corresponds to vehicle speed. The speedometer/odometer responds to the frequency of tester 200 inputs as it would to a signal from the vehicle speed sensor.

In normal operation, the tester 200 has two means of varying the output frequency to test leads 100 and 102. The first is by switch S2, a two pole, three position switch which can be moved from its central "off" position to connect either resistor R3 and C1 to the timer T100 circuit or which can alternatively be set to connect resistor R4 and capacitor C2 to the timer T100 circuit. Selection of resistor R3 and capacitor C1 produces a low frequency tester T100 output, simulating frequencies consistent with vehicle velocities in the range of 60 miles per hour. Selection of resistor R4 and capacitor C2 will cause the tester 200 to emit higher frequencies to test the speedometer/odometer response to frequencies related to higher speeds. For a preset value of potentiometer R6, each frequency, generated by resistor R3 capacitor C1 combination or resistor R4 capacitor C2 combination when connected to timer T100, is precalibrated as hereinafter described, is known, and produces an output signal corresponding to predetermined vehicle speed. Said signal should be processed by the speedometer/odometer to display an expected speed and time varying distance measurement.

Attention is drawn to resistor network, R5, R6 and R7. Resistor R6 is a variable resistor or potentiometer. In combination resistors R5, R6 and R7 comprise a voltage divider network. The biasing voltage to the negative input of operational amplifier OP1 is determined by the position of potentiometer output A1 on potentiometer R6. Varying said biasing voltage changes the voltage level to which either charging capacitor C1 or capacitor C2 must charge before Flip Flop FF1 is set. Changing said biasing voltage, thus changes the time taken for capacitors C1 ad C2 to charge to exceed the new bias voltage level thereby changing the timer T100 frequency. Thus, the second means of varying the output frequency is by varying the level of the biasing voltage to operational amplifier OP1 through the utilization of the voltage divider formed by resistors R5, R6 and R7. This second means provides an uncalibrated, variable frequency to test leads 100 and 102 to test speedometer/odometer dynamic operation.

Following is a table comprising a list of the electrical components of tester 200 and, where appropriate, the values of said components:

| Item No. | Component | Component Designation | Component Value or other Description |
|---|---|---|---|
| 1 | Battery | B1 | 9 v |

-continued

| Item No. | Component | Component Designation | Component Value or other Description |
|---|---|---|---|
| 2 | resistor | R1 | 33 k ohms |
| 3 | resistor | R2 | 10 k ohms |
| 4 | variable resistor | R3 | 10 k ohms |
| 5 | variable resistor | R4 | 10 k ohms |
| 6 | resistor | R5 | 2.2 k ohms |
| 7 | potentiometer | R6 | 10 k ohms |
| 8 | resistor | R7 | 2.2 k ohms |
| 9 | resistor | R8 | 330 k ohms |
| 10 | timer | T100 | 555 Timer |
| 11 | switch | S1 | Bilateral Switch |
| 12 | switch | S2 | 3 position, 3 pole |
| 13 | LED | L1 | Light emitting diode |
| 14 | capacitor | C1 | 1 micro f |
| 15 | capacitor | C2 | .47 micro f |

Construction of the tester is accomplished by first obtaining a circuit board manufactured by either a chemical or photo-etched process. The circuit for the currently preferred tester 200 circuit is diagrammatically shown in FIG. 1. Select components as shown in the electrical component list in the table above and install and solder them into their designated locations. Next, connect wires to the external control switches S2, potentiometer controls R6 and variable resistor controls R3 and R4, and LED L1, each placed in accessible positions in the project box containing tester 200 as shown in FIG. 5.

Figure 5:
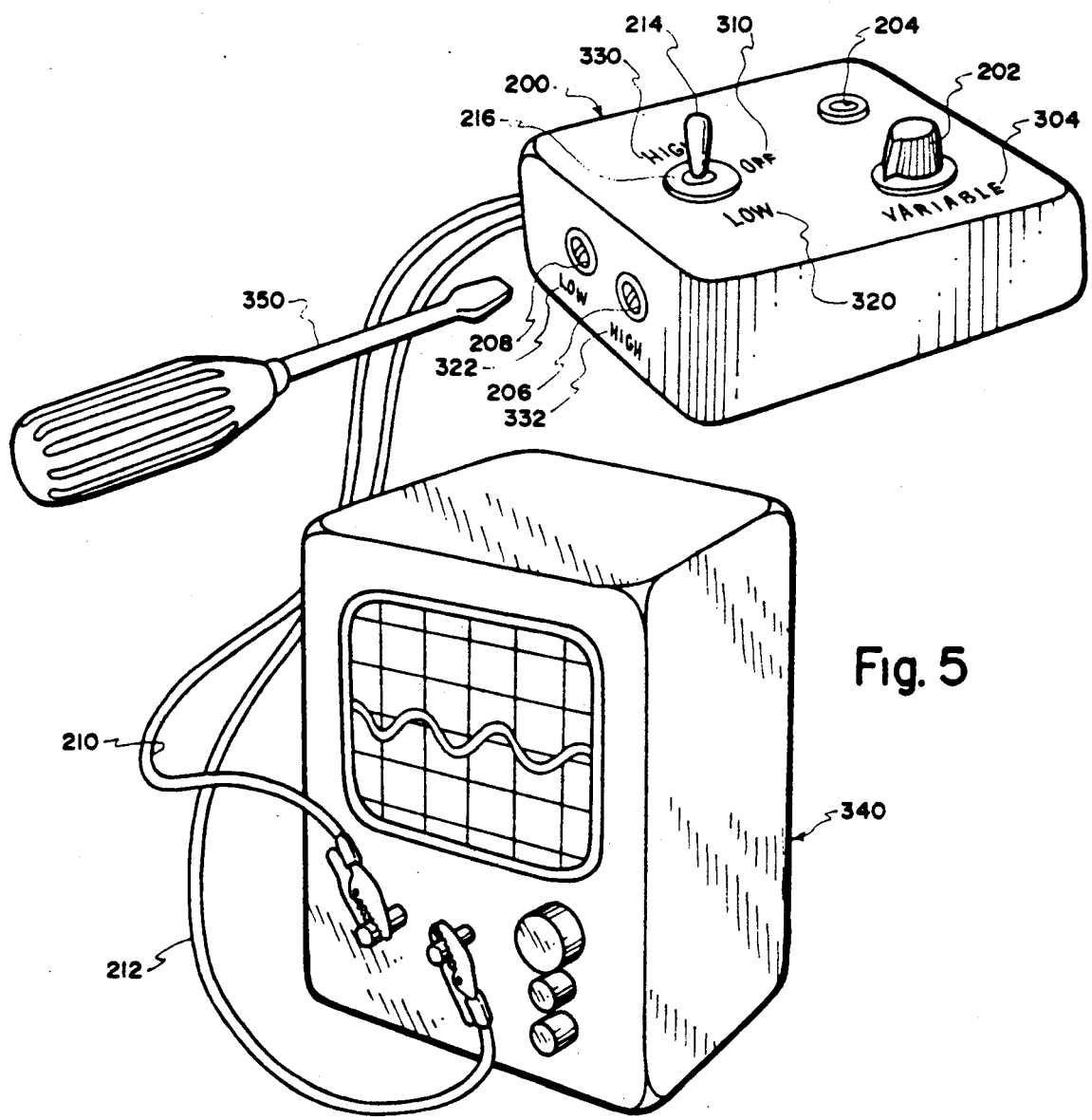
FIG. 5 is a perspective of a presently, preferred speedometer/odometer tester connected to an oscilloscope for purposes of calibrating the tester.

Mechanical knob 202 of potentiometer R6, placed as shown in FIG. 5, is connected to potentiometer output A1. The word "VARIABLE" is positioned below the potentiometer knob as shown in FIG. 5. Switch lever 214 for switch S2 and mounting mechanism 216 are assembled where shown and connected to wires as depicted in FIG. 1. Labels "HIGH" 214, "OFF" 310 and "LOW" 320 are positioned to show the operational mode selected by positioning the switch lever arm 214 of switch S2 in each of its three positions. LED L1 is mounted to be viewed through display aperture 204 and wired to R8. Screw driver access to variable resistors R3 and R4 is provided through holes 208 and 206, respectively. Test lead extensions 210 and 212 of the test leads 100 and 102 are provided through holes on the back side of case of tester 200 (not shown) and fitted with rubber grommets to protect wire insulation from being cut.

The battery B1 is installed, within the case of tester 200, on the circuit board, providing a resident, self-contained power supply in a small, highly mobile package.

When assembly is complete, the technician, connects the test lead extensions 210 and 212 to an oscilloscope or frequency counter to calibrate the tester to factory pre-set desired frequencies for both the low and high frequency ranges. The currently preferred frequencies are 192 Hz for the low range and 285 Hz for the high range. Even though the above indicated frequencies represent high and low frequencies of currently preferred choice, the available tester testing frequency range is adjustable because of incorporation of variable resistors R3 and R4. Precise adjustment of either or both high and low frequencies can be accomplished by the following steps:

(1) Turn the variable potentiometer to its low speed (low voltage) position. (2) Connect test lead extensions 210 and 212 to an oscilloscope or frequency counter. Set oscilloscope or frequency counter for frequency range to which tester 200 is to be calibrated. (3) Select high or low frequency range, by setting switch lever 214 of switch S2. (4) Adjust frequency of selected frequency range by screw driver 216 adjustment through access holes 206 and 208 until the desired calibration frequency is displayed in the oscilloscope or frequency counter. As marked by label "LOW" 322, screw driver adjustment through hole 208 adjusts resistance value of resistor R3. Screw driver adjustment through access hole 206, as marked by label "HIGH" 332, adjusts resistance value of resister R4.

The tester 200 can be used to test both electronic speedometer and odometers without having to elevate the vehicle from the ground or require the engine to be running. The speedometer to be tested can also be either engaged or disengaged from the vehicle during test procedure. No local power supply is required for the tester 200, as it contains a resident 9 v power source (e.g. Battery B1) to generate the output signal to the speedometer. Only a +12 v DC source is required in order to activate the speedometer during the test procedure.

Four major functions are possible with the tester: (1) testing a speedometer/odometer while in a vehicle, independent of motor operation, and isolating source of apparent speedometer/odometer failure between the vehicle's speed sensor and speedometer/odometer; (2) testing the vehicle's cruise control mechanism; (3) testing speedometers/odometers removed from the vehicle; (4) diagnosing mechanical wear and difficulties within odometer mechanisms.

The first test function of tester 200 comprises testing the vehicle's speedometer/odometer while it is still in the vehicle. The vehicle speed sensor is disconnected and test leads extensions 210 and 212 of tester 200 are connected to the vehicle speedometer/odometer, via the quick-disconnect electrical plug at the end of the vehicle speed sensor's leads, or by removing the speedometer from the vehicle dashboard and connecting it to tester 200 as shown in FIG. 3. The signals from tester 200 substitute for signals received from the vehicle speed sensor. After attaching test lead extensions 210 and 212 to speed sensor input terminals 220 and 222 located on the rear of the vehicle speedometer/odometer as shown in FIG. 7, the technician turns on the vehicle's ignition to supply power from the battery to the speedometer/odometer, then turns on tester 200 to switch S2 position to select the appropriate frequency range for the speedometer being tested. Monitoring displayed speed and rate of odometer mileage change allows the technician to determine steady state response to a constant, known frequency input. Dynamic response of the speedometer can then be tested by turning knob 202, varying the frequency to the speedometer/odometer to test dynamic response and range.

If the speedometer/odometer is found to operate correctly, and subsequent operation of the vehicle shows erroneous speedometer/odometer operation, the technician can conclude the fault lies within the defective vehicle speed sensor.

A second application of the tester involves testing the vehicle's cruise control system for smooth, accurate operation. After attaching the tester in the manner previously described in the first test and switching the vehicle's battery power on, the frequency of the tester is then adjusted to simulate the desired vehicle speed that is to reach the cruise control mechanism. Monitoring of the cruise control can then be accomplished either by observing the electrical measurements at the various cruise control components, or by observing the mechanical function of the servo mechanism after applying a simulated engine vacuum to the cruise control mechanism. This test allows the technician to pinpoint possible problems within cruise control components or the link comprising the cruise control and the speedometer.

Figure 6:
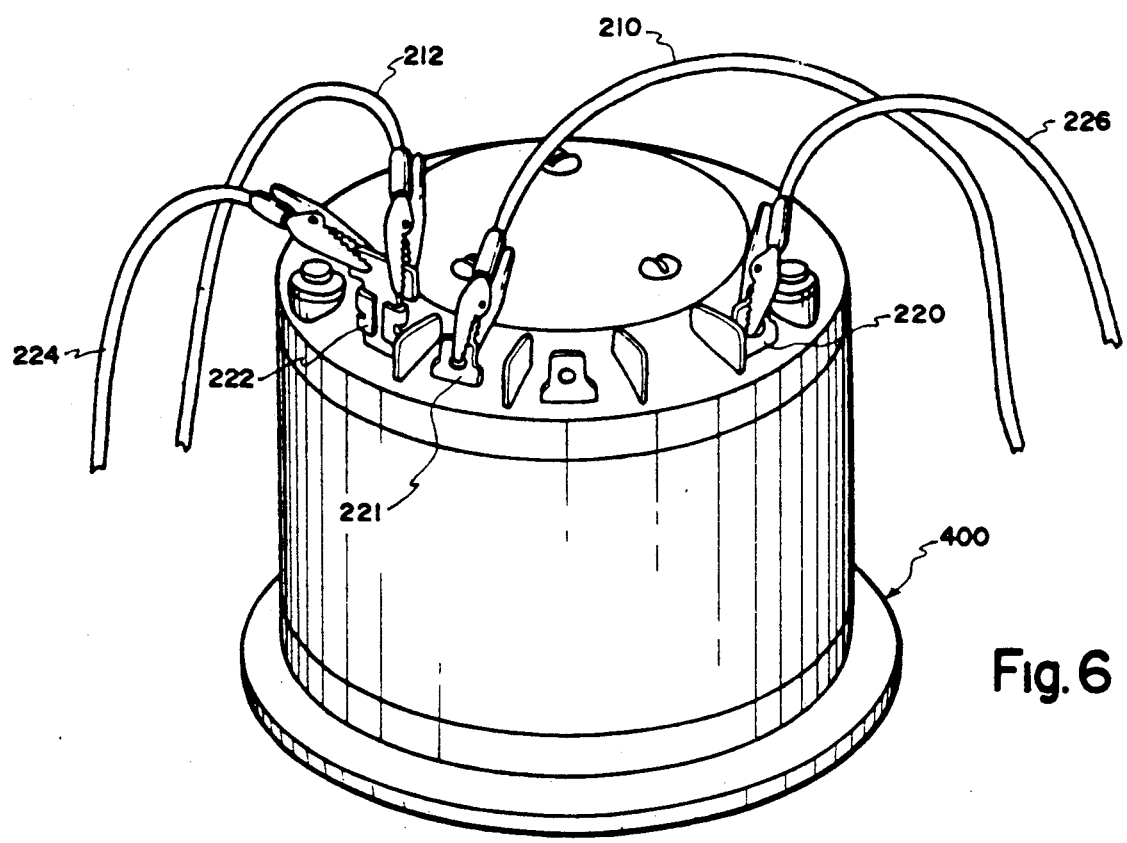
FIG. 6 is a perspective of the anterior side of a speedometer/odometer removed from a vehicle showing electrical connections to the speedometer/odometer.

A third test involves the above-mentioned procedures to test speedometers and odometers that have been previously disengaged from the vehicle. The tester's lead extensions 210 and 212 are connected directly to the speedometer. See FIGS. 4 and 6. A 12 v D.C. power source is then supplied to the speedometer through power cables 226 and 224 attached to speedometer terminals 220 and 222, as shown in FIGS. 4 and 6. The tester is activated, adjusted to the desired speed and speedometer is tested, as described above.

The tester 200 can also be used in a fourth procedure to diagnose internal problems within electrical odometers. Such difficulties are typically signaled by a "clicking" noise which emanates from the odometer motor within the speedometer or odometers mounted remotely for purposes of counting miles for maintenance interval indicators (example: EGR light, oxygen sensor light). The noise grows progressively worse as vehicle speed increases.

Through the use of the novel invention and selected methods presently described, the technician is able to avoid the precarious and often dangerous task of the attempting to drive the vehicle (in order that the odometer be operative), while simultaneously struggling to inspect, test, and operate a tester. By attaching tester 200 leads extensions 210 and 212 to the speedometer and adjusting the simulated vehicle speed, the technician is able to test the speeds while the vehicle remains stationary, thereby avoiding the risk of possible injury while at the same time eliminating distracting engine noise from the vehicle while allowing positive identification and location of the defective component within the speedometer.

The invention may be embodied in other specific forms without departing from the spirit or essential characteristics thereof. The present embodiments, are, therefore, to be considered in all respects as illustrative and not restrictive, the scope of the invention being indicated by the appended claims rather than by the foregoing description, and all changes which come within the meaning and range of equivalence of the claims are therefore to be embraced therein.

What is claimed and desired to be secured by United States Letters Patent is:

1. A mobile independent electronic speedometer/odometer tester assembly comprising:
a portable dual-range speedometer/odometer testing device for determining the accuracy of a speedometer or odometer comprising frequency determining means which provide a controlled variable frequency signal and means for simulating vehicular speed at the speedometer by sending the controlled variable frequency signal from the frequency determining means to the vehicular speed simulating means and thence to the speedometer or odometer through test leads, the test leads being interconnected to input leads of the speedometer or odometer, means for linearly adjusting simulated vehicular speed during a test such that the speedometer or odometer is dynamically tested, variable memory means comprising means by which calibrations for said controlled variable frequency are entered and which communicate with said frequency determining means to preset simulated vehicular speeds, and means for indicating to a testing operator said preset simulated vehicular speeds.

2. A tester assembly according to claim 1 wherein said variable memory means comprise a voltage divider which comprises at least one rheostat and sends a variable, controlled electrical signal to an integrated astable timing circuit coupled to a bilateral switch.

3. A tester assembly according to claim 1 further comprising a resident electrical power supply within the assembly.

4. An assembly according to claim 1 further comprising an LED indicator, which flickers at the frequency of said controlled variable frequency, to signal that the testing device is functioning.

5. An assembly according to claim 1 wherein the memory means further comprise frequency selection means for testing speedometers at both low and high speed ranges, each range being calibratable.

6. An assembly according to claim 1 wherein said linear speed adjustment means comprise user accessible rheostat means which permit visual measurements at user controlled rates and changes in rates, whereby evidence of mechanical wear and, thereby, difficulties are diagnosed and located within the odometer motor audibly and/or visually, and also within the link within the odometer and speedometer.

7. An assembly according to claim 1 wherein said memory means further comprise high speed test means whereby failure testing of the speedometer comprises low and high speed testing wherein high speed testing is above 60 mph.

8. A method of testing an electrical speedometer or odometer, from which the input leads of the speedometer are available, said method comprising the steps of:
providing a calibrated tester;
disconnecting the speed sensor from the back of the speedometer housing (or other convenient point) and attaching the leads of the tester to the speedometer housing;
turning on the testing device and selecting the desired preset simulated vehicle speed reading for the speedometer;
and observing whether the speedometer so attached functions at a fixed rate according to specification;
linearly varying the speed to test dynamic response of said speedometer.

9. A method according to claim 8 further comprising the testing of electrical speedometers and odometers that have been removed from the vehicle.

10. The method according to claim 9 further comprising the step of releasing the leads to said testing device from said input leads of a speedometer after testing of the speedometer or odometer, is completed and the preset simulated vehicle speed has been determined, whereby said testing device is repeatedly used in subsequent tests.

11. A mobile independent electronic speedometer/odometer tester assembly comprising:
means for selecting a simulated speed determining frequency at which a speedometer/odometer is tested;
means for adjusting and calibrating said speed determining frequency;
square wave oscillator generating means, the cyclic output rate of which is at least partially determined by said selecting means and which provide the speed determining frequency for the speedometer/odometer to be tested;

tester output means which provide test leads to the speedometer/odometer and isolation between said oscillator generating means and the speedometer/odometer;

said adjusting means comprising linear control means whereby the output frequency is linearly varied during a test to test dynamic response of said speedometer/odometer.

12. A mobile independent electronic speedometer/odometer tester assembly comprising:

means for selecting a simulated speed determining frequency at which a speedometer/odometer is tested;

means for calibrating said speed determining frequency;

square wave oscillator generating means, the cyclic output rate of which is at least partially determined by said selecting means and which provide the speed determining frequency for the speedometer/odometer to be tested;

tester output means which provide test leads to the speedometer/odometer and electrical isolation between said oscillator generating means and the speedometer/odometer;

adjusting means whereby a linear adjustment is mad during a test to determine dynamic response of said speedometer/odometer.

* * * * *